US012322556B2

(12) United States Patent
Jeong et al.

(10) Patent No.: US 12,322,556 B2
(45) Date of Patent: Jun. 3, 2025

(54) MULTILAYER ELECTRONIC COMPONENT

(71) Applicant: SAMSUNG ELECTRO-MECHANICS CO., LTD., Suwon-si (KR)

(72) Inventors: Mun Seong Jeong, Suwon-si (KR); Jung Min Kim, Suwon-si (KR); Jin Kyung Park, Suwon-si (KR); Chang Soo Jang, Suwon-si (KR); Su Ji Kang, Suwon-si (KR); Na Young Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 220 days.

(21) Appl. No.: 18/104,928

(22) Filed: Feb. 2, 2023

(65) Prior Publication Data
US 2024/0161981 A1 May 16, 2024

(30) Foreign Application Priority Data

Nov. 10, 2022 (KR) .................. 10-2022-0149742

(51) Int. Cl.
*H01G 4/30* (2006.01)
*H01G 4/008* (2006.01)
*H01G 4/012* (2006.01)
*H01G 4/12* (2006.01)

(52) U.S. Cl.
CPC ............... *H01G 4/30* (2013.01); *H01G 4/008* (2013.01); *H01G 4/012* (2013.01); *H01G 4/12* (2013.01)

(58) Field of Classification Search
CPC .......... H01G 4/30; H01G 4/008; H01G 4/012; H01G 4/12
See application file for complete search history.

(56) References Cited

U.S. PATENT DOCUMENTS

| | | | |
|---|---|---|---|
| 2006/0088719 A1* | 4/2006 | Ito | H01G 4/1218 428/701 |
| 2007/0009719 A1* | 1/2007 | Naito | H01G 4/1236 428/210 |
| 2007/0074806 A1* | 4/2007 | Kojima | C04B 35/638 156/89.12 |
| 2008/0110006 A1* | 5/2008 | Ito | H01G 4/08 29/25.42 |

(Continued)

FOREIGN PATENT DOCUMENTS

| | | |
|---|---|---|
| KR | 10-2014-0081568 A | 7/2014 |
| KR | 10-2015-0010679 A | 1/2015 |

*Primary Examiner* — David M Sinclair
*Assistant Examiner* — Kaemon Eli Watada
(74) *Attorney, Agent, or Firm* — Morgan, Lewis & Bockius LLP

(57) ABSTRACT

A multilayer electronic component includes a body including a capacitance forming portion including a dielectric layer and internal electrodes alternately disposed with the dielectric layer in a first direction and a cover portion disposed on one surface and the other surface of the capacitance forming portion in the first direction, and external electrodes disposed on the body, wherein a secondary phase including Al is disposed at an interface between the internal electrode and the dielectric layer, and the ratio of an area occupied by the secondary phase to an area of the capacitance forming portion is 0.03% or more and 0.40% or less.

15 Claims, 4 Drawing Sheets

(56) References Cited

U.S. PATENT DOCUMENTS

| | | | |
|---|---|---|---|
| 2011/0141652 A1* | 6/2011 | Chang | H01G 4/12 |
| | | | 361/272 |
| 2012/0033344 A1* | 2/2012 | Nakamura | C04B 35/4682 |
| | | | 501/137 |
| 2014/0177133 A1* | 6/2014 | Lee | H01G 4/1209 |
| | | | 361/321.4 |
| 2017/0032895 A1* | 2/2017 | Ogata | H01G 4/1227 |

* cited by examiner

MULTILAYER ELECTRONIC COMPONENT

CROSS-REFERENCE TO RELATED APPLICATION

The present application claims the benefit of priority to Korean Patent Application No. 10-2022-0149742 filed on Nov. 10, 2022 in the Korean Intellectual Property Office, the disclosure of which is incorporated herein by reference in its entirety.

1. Technical Field

The present disclosure relates to a multilayer electronic component.

2. Background

A multilayer ceramic capacitor (MLCC), a type of multilayer electronic component, is a chip-type condenser mounted on the printed circuit boards of various electronic products, such as display devices including liquid crystal displays (LCDs) and plasma display panels (PDPs), computers, smartphones, cell phones, and the like, to allow electricity to be charged therein and discharged therefrom.

Currently, as the miniaturization of electronic devices progresses, miniaturization and high integration of multilayer electronic components are also required. In particular, in the case of a multilayer ceramic capacitor (MLCC) as a general-purpose electronic component, various attempts have been made to undertake thinning thereof and to implement higher capacity therein.

Among the methods for achieving miniaturization and high capacitance of multilayer ceramic capacitors, a reduction in the thickness of internal electrodes or dielectric layers may significantly affect connectivity of the internal electrodes or breakdown voltage (BDV) characteristics.

Therefore, it is necessary to design a microstructure capable of securing capacitance characteristics of the multilayer ceramic capacitor and at the same time securing connectivity and reliability of internal electrodes.

SUMMARY

An aspect of the present disclosure is to improve breakdown voltage (BDV) characteristics, while improving capacitance per unit volume of a multilayer electronic component.

Another aspect of the present disclosure is to secure electrode connectivity of internal electrodes.

Another aspect of the present disclosure is to solve the problem of difficulty in securing electrode connectivity when dielectric layers or internal electrodes are formed to be thin in order to miniaturize or increase capacitance of multilayer electronic components.

According to an aspect of the present disclosure, a multilayer electronic component includes a body including a capacitance forming portion including a dielectric layer and internal electrodes alternately disposed with the dielectric layer in a first direction and a cover portion disposed on one surface and the other surface of the capacitance forming portion in the first direction, and external electrodes disposed on the body, wherein a secondary phase including Al is disposed at an interface between the internal electrode and the dielectric layer, and the ratio of an area occupied by the secondary phase to an area of the capacitance forming portion is 0.03% or more and 0.40% or less.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
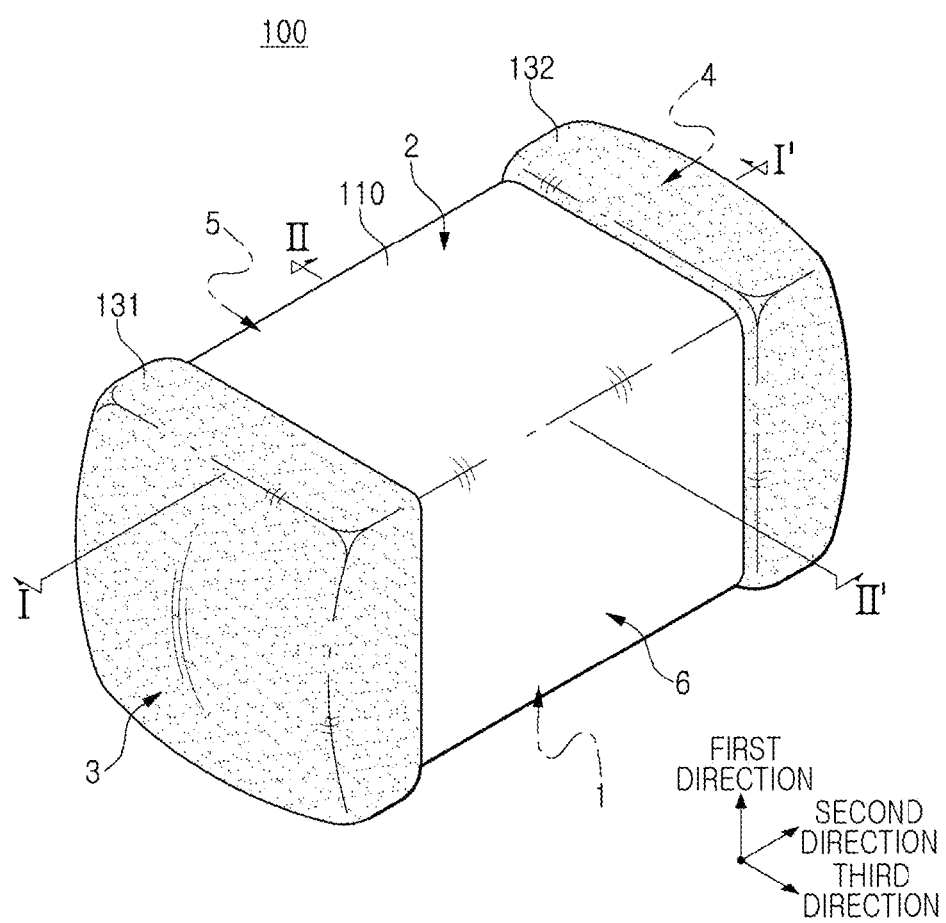
FIG. 1 is a perspective view schematically illustrating a multilayer electronic component that may be manufactured by a method of manufacturing a multilayer electronic component according to an exemplary embodiment in the present disclosure.

Exemplary embodiments of the present disclosure will now be described in detail with reference to the accompanying drawings.

In the drawing, a first direction is a direction in which first and second internal electrodes are alternately disposed with a dielectric layer interposed therebetween or a thickness (T) direction, and a second direction and a third direction are perpendicular to the first direction, in which the second direction may be defined as a length (L) direction and the third direction may be defined as a width (W) direction.

FIG. 1 is a perspective view schematically illustrating a multilayer electronic component that may be manufactured by a method of manufacturing a multilayer electronic component according to an exemplary embodiment in the present disclosure.

Figure 2:
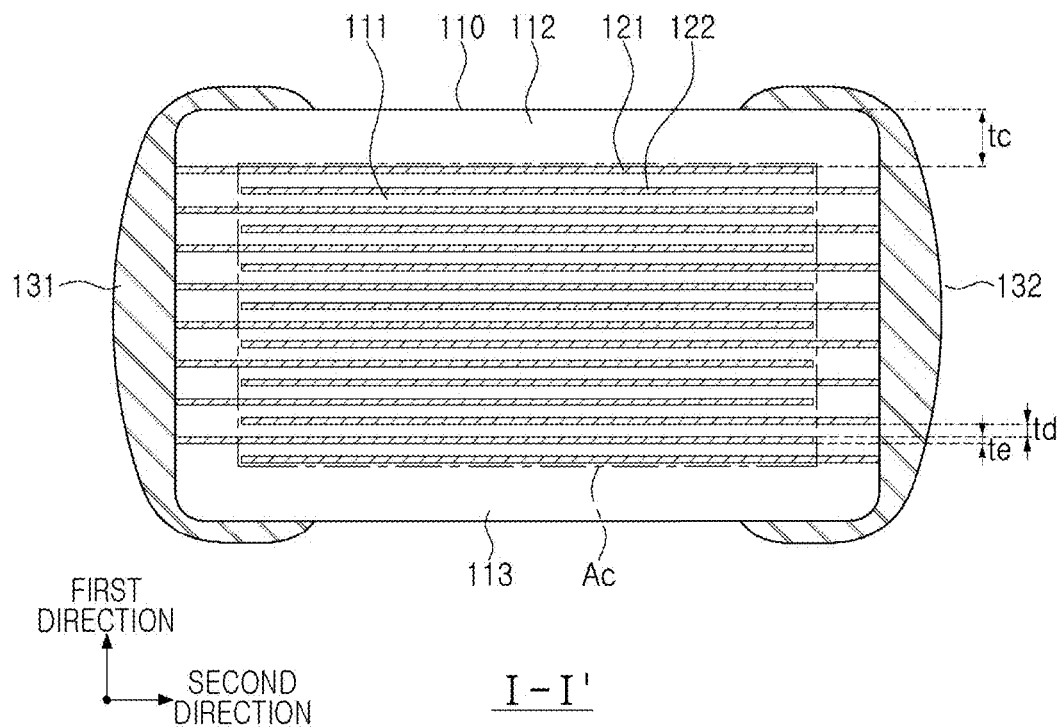
FIG. 2 is a cross-sectional view of FIG. 1, taken along line I-I'.

FIG. 2 is a cross-sectional view of FIG. 1, taken along line I-I'.

Figure 3:
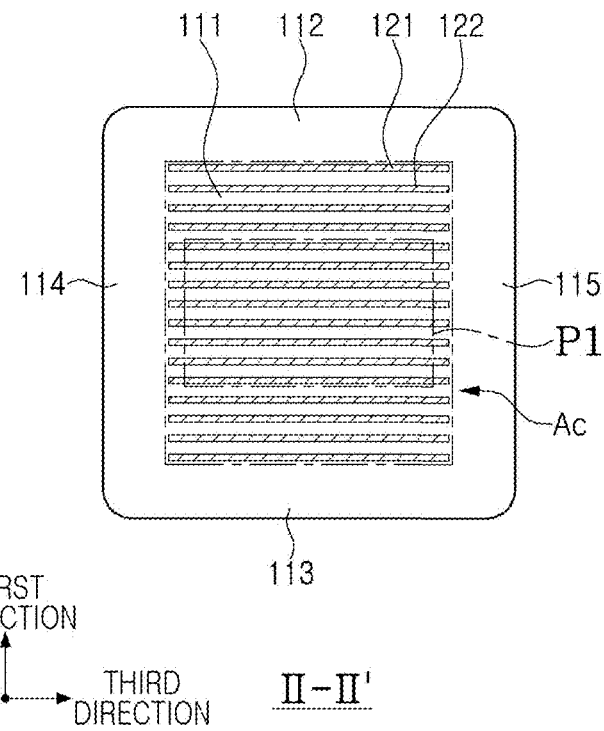
FIG. 3 is a cross-sectional view of FIG. 1, taken along line II-II'.

FIG. 3 is a cross-sectional view of FIG. 1, taken along line II-II'.

Figure 4:
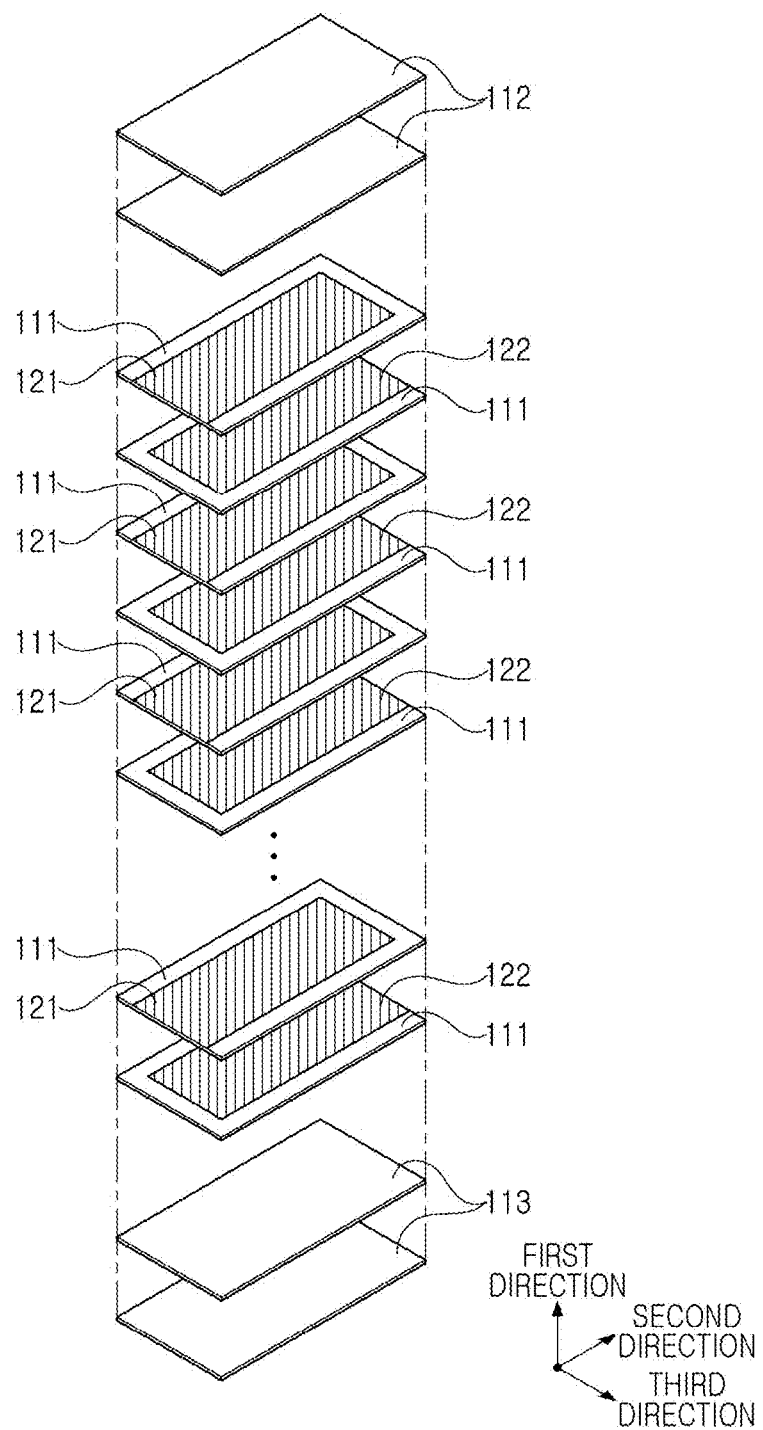
FIG. 4 schematically illustrates a method of manufacturing a multilayer electronic component according to Comparative Example.

FIG. 4 schematically illustrates a method of manufacturing a multilayer electronic component according to the Comparative Example.

Figure 5:
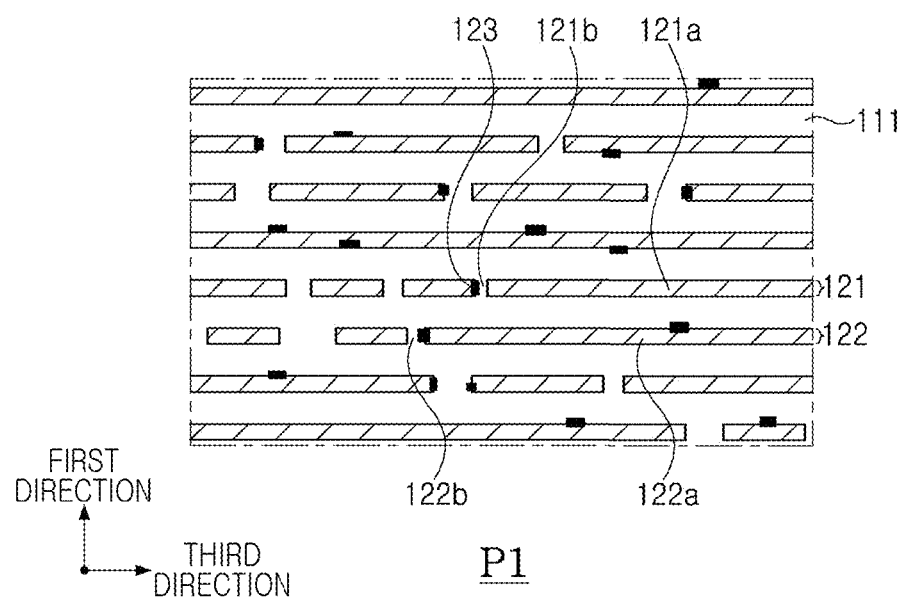
FIG. 5 is an enlarged schematic view of an area P1 of FIG. 3.

FIG. 5 is an enlarged schematic view of an area P1 of FIG. 3.

Hereinafter, the multilayer electronic component 100 according to an exemplary embodiment in the present disclosure will be described in detail with reference to FIGS. 1 through 5.

A multilayer electronic component 100 according to an exemplary embodiment in the present disclosure includes a body 110 including a capacitance forming portion (Ac) including a dielectric layer 111 and internal electrodes 121 and 122 alternately disposed with the dielectric layer 111 in a first direction and cover portions 112 and 113 disposed on one surface and the other surface of the capacitance forming portion (Ac) in the first direction and external electrodes 131 and 132 disposed on the body 110, wherein a secondary phase 123 including Al is disposed at an interface between the internal electrodes 121 and 122 and the dielectric layer 111, and the ratio of an area occupied by the secondary phase 123 to an area of the capacitance forming portion (Ac) is 0.03% or more and 0.40% or less.

In the body 110, the dielectric layers 111 and the first and second internal electrodes 121 and 122 are alternately stacked.

Although a specific shape of the body 110 is not particularly limited, as shown, the body 110 may have a hexahedral shape or a shape similar thereto. Due to the shrinkage of ceramic powder particles included in the body 110 during a sintering process, the body 110 may not have a perfectly straight hexahedral shape but may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

The plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder, and the ceramic powder may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca, Zr, and the like are partially dissolved in $BaTiO_3$.

In addition, as a material for forming the dielectric layer 111, various ceramic additives, organic solvents, binders, dispersants, etc. may be added to the powder such as barium titanate ($BaTiO_3$) according to purposes of the present disclosure.

Meanwhile, an average thickness (td) of the dielectric layer 111 may not be particularly limited. For example, an average thickness (td) of the dielectric layer 111 may be 0.2 μm or more and 2 μm or less.

However, in general, when the dielectric layer is formed to be thin to have a thickness less than 0.6 μm, in particular, when the thickness of the dielectric layer is 0.35 μm or less, reliability of the multilayer electronic component 100 may be further deteriorated.

According to an exemplary embodiment in the present disclosure, the secondary phase 123 including aluminum (Al) may be disposed at a part of the interface or an enter interface between the first and second internal electrodes 121 and 122 and the dielectric layer 111, and by adjusting the ratio of the area occupied by the secondary phase 123 to the area of the capacitance forming portion (Ac) to be 0.03% or more and 0.40% or less, the reliability of the multilayer electronic component 100 may be secured even when the average thickness (td) of the dielectric layer 111 is 0.35 μm or less. That is, when the average thickness (td) of the dielectric layer 111 is 0.35 μm or less, the effect of improving reliability according to the present disclosure may be more remarkable.

The average thickness (td) of the dielectric layer 111 may refer to an average thickness (td) of the dielectric layer 111 disposed between the first and second internal electrodes 121 and 122.

The average thickness (td) of the dielectric layer 111 may be measured by scanning an image of a cross-section of the body 110 in the length-thickness (L-T) direction with a scanning electron microscope (SEM) having a magnification of 10,000. More specifically, the average value may be measured by measuring the thickness of one dielectric layer at 30 equally spaced points in the longitudinal direction in the scanned image. The 30 points at equal intervals may be designated in the capacitance forming portion (Ac). In addition, if the average value is measured by extending the measurement of the average value to 10 dielectric layers, the average thickness of the dielectric layers may be more generalized.

The body 110 may include the capacitance forming portion (Ac) formed inside the body 110 and forming capacitance with the first internal electrode 121 and the second internal electrode 122 alternately disposed with the dielectric layer 111 interposed therebetween and cover portions 112 and 113 formed above and below the capacitance forming portion (Ac) in the first direction.

In addition, the capacitance forming portion (Ac) is a part that contributes to formation of capacitance of the capacitor, which may be formed by repeatedly stacking a plurality of first and second internal electrodes 121 and 122 with the dielectric layer 111 interposed therebetween.

The cover portions 112 and 113 may include an upper cover portion 112 disposed above the capacitance forming portion (Ac) in the first direction and a lower cover portion 113 disposed below the capacitance forming portion (Ac) in the first direction.

The upper cover portion 112 and the lower cover portion 113 may be formed by stacking a single dielectric layer or two or greater dielectric layers on upper and lower surfaces of the capacitance forming portion (Ac) in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, the average thickness of the cover portions 112 and 113 may not be particularly limited. However, the average thickness (tc) of the cover portions 112 and 113 may be 15 μm or less in order to more easily achieve miniaturization and high capacitance of the multilayer electronic component. In addition, according to an exemplary embodiment in the present disclosure, the secondary phase 123 including Al may be disposed at the interface between the first and second internal electrodes 121 and 122 and the dielectric layer 111, and since the ratio of the area occupied by the secondary phase 123 to the area of the capacitance forming portion (Ac) is adjusted to 0.03% or more and 0.40% or less, the reliability of the multilayer electronic component 100 may be secured even when the average thickness tc of the cover portion is 15 μm or less.

The average thickness of the cover portions 112 and 113 may refer to a size in the first direction, and may be a value obtained by averaging sizes of the cover portions 112 and 113 measured at five equally spaced points above or below the capacitance forming portion (Ac).

In addition, margin portions 114 and 115 may be disposed on side surfaces of the capacitance forming portion (Ac).

The margin portions 114 and 115 may include a first margin portion 114 disposed on the fifth surface 5 of the body 110 and a second margin portion 115 disposed on the sixth surface 6 of the body 110. That is, the margin portions 114 and 115 may be disposed on both end surfaces of the body 110 in the third direction (the width direction).

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the first and second internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or greater dielectric layers on both side surfaces of the capacitance forming portion (Ac) in the third direction (the width direction).

Meanwhile, the widths of the margins 114 and 115 may not be particularly limited. However, an average width of the margin portions 114 and 115 may be 15 μm or less in order to more easily achieve miniaturization and high capacitance of the multilayer electronic component. In addition, according to an exemplary embodiment in the present disclosure, the secondary phase 123 including Al is disposed at the interface between the first and second internal electrodes 121 and 122 and the dielectric layer 111, and since the ratio of the area occupied by the secondary phase 123 to the area of the capacitance forming portion (Ac) is adjusted to 0.03% or more and 0.40% or less, the reliability of the multilayer electronic component 100 may be secured even when the average width of the margin portions 114 and 115 is 15 μm or less.

The average width of the margin portions 114 and 115 may refer to an average size of the margin portions 114 and 115 in the third direction, and may be a value obtained by averaging sizes of the margin portions 114 and 115 measured at five equally spaced points on the side surface of the capacitance forming portion (Ac).

The first and second internal electrodes 121 and 122 may be alternately disposed with the dielectric layer 111 in the first direction.

The internal electrodes 121 and 122 may include first and second internal electrodes 121 and 122. The first and second internal electrodes 121 and 122 may be alternately disposed to face each other with the dielectric layer 111 constituting the body 110 interposed therebetween, and may be respectively connected to the third and fourth surfaces 3 and 4 of the body 110, respectively. Specifically, one end of the first internal electrode 121 may be connected to the third surface, and one end of the second internal electrode 122 may be connected to the fourth surface.

The first internal electrode 121 may be spaced apart from the fourth surface 4 and may be exposed to the third surface 3, and the second internal electrode 122 may be spaced apart from the third surface 3 and may be exposed to the fourth surface 4. The first external electrode 131 may be disposed on the third surface 3 of the body to be connected to the first internal electrode 121, and the second external electrode 132 may be disposed on the fourth surface 4 of the body to be connected to the second internal electrode 122.

That is, the first internal electrode 121 is not connected to the second external electrode 132 but connected to the first external electrode 131, and the second internal electrode 122 is not connected to the first external electrode 131 but connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed and subsequently sintering the green sheets.

A material for forming the first and second internal electrodes 121 and 122 is not particularly limited, and a material having excellent electrical conductivity may be used. For example, the first and second internal electrodes 121 and 122 may include at least one of nickel (Ni), copper (Cu), palladium (Pd), silver (Ag), gold (Au), platinum (Pt), tin (Sn), tungsten (W), titanium (Ti), or alloys thereof.

In addition, the first and second internal electrodes 121 and 122 may be formed by printing a conductive paste for the internal electrodes including at least one of nickel (Ni), copper (Cu), palladium (Pd), silver (Ag), gold (Au), platinum (Pt), tin (Sn), tungsten (W), titanium (Ti), or alloys thereof on a ceramic green sheet. A printing method of the conductive paste for the internal electrodes may be a screen printing method or a gravure printing method, but the present disclosure is not limited thereto.

Meanwhile, when the first and second internal electrodes 121 and 122 include nickel (Ni), a phenomenon in which breakdown voltage (BDV) is lowered as nickel (Ni) particles are atomized may become more problematic. According to an exemplary embodiment in the present disclosure, the secondary phase 123 including Al is disposed at the interface between the first and second internal electrodes 121 and 122 and the dielectric layer 111, and since the area occupied by the secondary phase 123 to the area of the capacitance forming portion (Ac) is adjusted to 0.03% or more and 0.40% or less, the reliability of the multilayer electronic component 100 may be improved even when the first and second internal electrodes 121 and 122 include nickel (Ni). That is, when the first and second internal electrodes 121 and 122 include nickel (Ni), the effect of improving the reliability according to the present disclosure may be more remarkable.

In addition, an average thickness (te) of the first and second internal electrodes 121 and 122 may not be particularly limited. For example, the average thickness te of the first and second internal electrodes 121 and 122 may be 0.2 μm or more and 2 μm or less.

However, if the internal electrodes are formed to be thin to have a thickness less than 0.6 μm in general, and particularly, when the thickness of internal electrodes is 0.35 μm or less, the reliability of the multilayer electronic component 100 may be more problematic.

According to an exemplary embodiment in the present disclosure, the secondary phase 123 including Al is disposed at the interface between the first and second internal electrodes 121 and 122 and the dielectric layer 111, and since the ratio of the area occupied by the secondary phase 123 to the area of the capacitance forming portion (Ac) is adjusted to about 0.03% or more and about 0.40% or less, or about 0.03% or more and about 0.4% or less, the reliability may be improved even when the average thickness (te) of the first and second internal electrodes 121 and 122 is 0.35 μm or less.

Accordingly, when the thickness of the first and second internal electrodes 121 and 122 is 0.35 μm or less, the effect according to the present disclosure may be more remarkable and miniaturization and high capacitance of the ceramic electronic component may be more easily achieved. The term "about," as used herein, means approximately. In general, the term "about" is used herein to modify a numerical value above and below the stated value by a variance of 10%. In one aspect, the term "about" means plus or minus 20% of the numerical value of the number with which it is being used.

The average thickness (te) of the first and second internal electrodes 121 and 122 may refer to the average thickness (te) of the first and second internal electrodes 121 and 122.

The average thickness (te) of the first and second internal electrodes 121 and 122 may be measured by scanning an image of a cross-section of the body 110 in the length-thickness (L-T) direction with a scanning electron microscope (SEM) having a magnification of 10,000. More specifically, the average value may be measured by measuring the thickness of one internal electrode at 30 equally spaced points in a longitudinal direction in the scanned image. The 30 points at equal intervals may be designated in the capacitance forming portion (Ac). In addition, if the average value is measured by extending the measurement of the average value to 10 internal electrodes, the average thickness of the internal electrodes may be more generalized.

The first and second external electrodes 131 and 132 may be disposed on the third surface 3 and the fourth surface 4 of the body 110, respectively. The first and second external electrodes 131 and 132 may include first and second external electrodes 131 and 132 respectively disposed on the third and fourth surfaces 3 and 4 of the body 110 and connected to the first and second internal electrodes 121 and 122, respectively.

In this exemplary embodiment, a structure in which the multilayer electronic component 100 has two external electrodes 131 and 132 is described, but the number and shape of the first and second external electrodes 131 and 132 depend on the shape of the first and second internal electrodes 121 and 122 or other purposes.

Meanwhile, the first and second external electrodes 131 and 132 may be formed using any material as long as the material has electrical conductivity, such as metal, and a specific material may be determined in consideration of electrical characteristics, structural stability, and the like, and the first and second external electrodes 131 and 132 may further have a multilayer structure.

For example, the first and second external electrodes 131 and 132 may include an electrode layer disposed on the body 110 and a plating layer formed on the electrode layer.

As a more specific example of the electrode layer, the electrode layer may be a fired electrode including a conductive metal and glass or a resin-based electrode including a conductive metal and resin.

In addition, the electrode layer may have a structure in which a fired electrode and a resin-based electrode are sequentially formed on the body. Also, the electrode layer may be formed by transferring a sheet including a conductive metal onto the body or by transferring a sheet including a conductive metal onto a fired electrode.

As the conductive metal included in the electrode layer, a material having excellent electrical conductivity may be used, but is not particularly limited. For example, the conductive metal may include at least one of nickel (Ni), copper (Cu), or alloys thereof.

The plating layer serves to improve mounting characteristics. The type of the plating layer is not particularly limited, and may be a plating layer including at least one of Ni, Sn, Pd, or alloys thereof, and may be formed of a plurality of layers.

For a more specific example of the plating layer, the plating layer may include a Ni plating layer or a Sn plating layer, may have a structure in which a Ni plating layer and a Sn plating layer are sequentially formed on the electrode layer, or may have a structure in which a Sn plating layer, a Ni plating layer, and a Sn plating layer are sequentially formed. Further, the plating layer may include a plurality of Ni plating layers and/or a plurality of Sn plating layers.

The size of the multilayer electronic component 100 may not be particularly limited.

However, in order to achieve miniaturization and high capacitance at the same time, the thickness of the dielectric layer and the internal electrodes need to be reduced to increase the number of layers, and therefore, the multilayer electronic component 100 may have a size of 0603 (length× width, 0.6 mm×0.3 mm) or less, and in this case, the effect of improving adhesion strength according to the present disclosure may be more remarkable.

Therefore, when the length of the multilayer electronic component 100 is 0.66 mm or less, and the width is 0.33 mm or less in consideration of manufacturing errors, external electrode sizes, etc., the adhesion strength improvement effect according to the present disclosure may be more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

According to an exemplary embodiment in the present disclosure, the secondary phase 123 including Al may be disposed at the interface between the first and second internal electrodes 121 and 122 and the dielectric layer 111. The secondary phase 123 including Al may serve to enhance thermal characteristics of the internal electrodes. When the material forming the first and second internal electrodes 121 and 122 is atomized to reduce the thickness and size of the multilayer electronic component 100, the thermal characteristics of the first and second internal electrodes 121 and 122 after firing may deteriorate. According to an exemplary embodiment in the present disclosure, the secondary phase 123 including Al is disposed at the interface between the first and second internal electrodes 121 and 122 and the dielectric layer 111, thereby suppressing the degradation of the thermal characteristics of the first and second internal electrodes 121 and 122. Accordingly, the capacitance per unit volume of the multilayer electronic component 100 may be improved by improving the connectivity of the first and second internal electrodes 121 and 122. In addition, as the first and second internal electrodes 121 and 122 are improved, breakdown voltage (BDV) of the multilayer electronic component 100 may be improved.

As the proportion of the secondary phase 123 including Al increases in the capacitance forming portion (Ac), the electrode connectivity may be greatly improved. However, if the area of the secondary phase 123 including Al is excessively larger than the area of the capacitance forming portion (Ac), a problem in that the breakdown voltage is lowered may occur even though connectivity of the internal electrodes is improved. Specifically, if the ratio of the area occupied by the secondary phase 123 to the area of the capacitance forming portion (Ac) is less than 0.03%, the area occupied by the secondary phase 123 relative to the area of the capacitance forming portion (Ac) is not sufficient, so that the effect of improving the electrode connectivity of the first and second internal electrodes 121 and 122 may be insufficient. In addition, when the ratio of the area occupied by the secondary phase 123 to the area of the capacitance forming portion (Ac) is 0.03% or more, the area occupied by the secondary phase 123 relative to the area of the capacitance forming portion (Ac) is sufficient, so that thermal characteristics of the first and second internal electrodes 121 and 122 may be improved, and accordingly, the connectivity of the first and second internal electrodes 121 and 122 and the capacitance per unit volume and the breakdown voltage of the multilayer electronic component 100 may be improved. Meanwhile, if the ratio of the area occupied by the secondary phase 123 to the area of the capacitance forming portion (Ac) exceeds 0.40%, the capacitance per unit volume of the multilayer electronic component 100 may decrease even though the connectivity of the first and second internal electrodes 121 and 122 is improved. This may be because, if the secondary phase 123 including Al is excessively formed at the interface between the first and second internal electrodes 121 and 122 and the dielectric layer 111, the effect of weakening the electrical conductivity of the first and second internal electrodes 121 and 122 is dominant over the effect of improving the thermal characteristics.

Therefore, according to an exemplary embodiment in the present disclosure, the electrode connectivity and the breakdown voltage may be improved by adjusting the ratio of the area occupied by the secondary phase 123 including Al to the area of the capacitance forming portion (Ac) to 0.03% or more and 0.40% or less, and accordingly, the reliability of the multilayer electronic component 100 may be improved.

A method of measuring the ratio of the area occupied by the secondary phase 123 to the area of the capacitance forming portion (Ac) is not particularly limited.

First, a composition and content of the secondary phase 123 including Al may be measured by polishing the cross-sections of the multilayer electronic component 100 in the first and third directions to a central portion in the second direction, observing the central portion of the capacitance forming portion (Ac) with a scanning electron microscope (SEM), and then analyzing the type and content of elements through transmission electron microscope-energy dispersive X-ray spectroscopy (TEM-EDS) analysis.

In addition, the ratio of the area occupied by the secondary phase 123 including Al to the area of the capacitance forming portion (Ac) may correspond to an average value measured from an image obtained by magnifying a central portion of the capacitance forming portion (Ac) and each of both side regions (9.2 μm×5.4 μm) of the central portion by 30,000 times with an SEM, after polishing the cross-sections of the multilayer electronic component 100 in the first and third directions up to the central portion in the second direction. In the image magnified by the SEM, when the ratio of the area of pixels occupied by the secondary phase including Al to the area of all pixels of the cross-section is measured, the proportion of the area occupied by the secondary phase 123 including Al relative to the area of the capacitance forming portion (Ac) may be measured.

Therefore, in an exemplary embodiment, the ratio of the area occupied by the secondary phase 123 to the area of the capacitance forming portion (Ac) may be a value measured from the cross-sections of the multilayer electronic component 100 cut in the first and third directions.

In an exemplary embodiment, the secondary phase 123 including Al may include an oxide including Al. Accordingly, an effect of improving the connectivity of the first and second internal electrodes 121 and 122 according to the improvement in thermal characteristics of the first and second internal electrodes 121 and 122 may be further improved. The type of oxide including Al is not particularly limited. However, when an oxide including Al is alumina ($Al_2O_3$, melting point: 2072° C.) which is a ceramic material having a higher melting point than that of $BaTiO_3$ (1625° C.), which may be used as a material of the dielectric layer 111, and a melting point (1455° C.) of Ni, which may be used as a material of the first and second internal electrodes 121 and 122, the connectivity of the first and second internal electrodes 121 and 122 may be further improved by increasing a thermal contraction start temperature during formation of the first and second internal electrodes 121 and 122.

A method of adjusting the component of the secondary phase 123 including Al and the area occupied by the secondary phase 123 including Al relative to the capacitance forming portion (Ac) is not particularly limited. When forming the first and second internal electrodes 121 and 122, one or more of nickel (Ni), copper (Cu), palladium (Pd), silver (Ag), gold (Au), platinum (Pt), tin (Sn), tungsten (W), titanium (Ti), or alloys thereof, which are examples of a material having excellent electrical conductivity, and oxide powder including Al may be included, printed through the internal electrode printing method described above, and then adjusted by adjusting a firing atmosphere and temperature.

The secondary phase including Al may have crystalline region or crystal at the interface between the first and second internal electrodes 121 and 122 and the dielectric layer 111. The type of crystal of the secondary phase including Al is not particularly limited, and barium (Ba) may be further included in the crystal. When the secondary phase including Al is a crystal further including Ba, a withstand voltage of the multilayer electronic component 100 may be improved by suppressing diffusion of the secondary phase into the dielectric. In this case, the number of moles of Al relative to Ba included in the secondary phase 123 may be 0.5 or more and 2.5 or less.

In an exemplary embodiment, the secondary phase 123 including Al may further include one or more selected from the group consisting of Dy, Y, Ho, Er, La, or Sm. When one or more elements selected from the group consisting of Dy, Y, Ho, Er, La, or Sm are included in the secondary phase 123, the connectivity of the first and second internal electrodes 121 and 122 may be further improved, and the breakdown voltage of the multilayer electronic component 100 may be further improved.

Referring to FIG. 5, the first and second internal electrodes 121 and 122 may include first and second electrode regions 121a and 122a, respectively, including a conductive material, and when spaces between the first and second electrode regions 121a and 122a are referred to as first and second disconnected regions 121b and 122b, the secondary phase 123 may be disposed in a portion of the first and second disconnected regions 121b and 122b.

When the first and second internal electrodes 121 and 122 are formed by firing, metal particles inside the first and second internal electrodes 121 and 122 may locally aggregate to form voids, and these voids may cause disconnection as the firing progresses to deteriorate the connectivity of the internal electrodes. That is, the first and second disconnected regions 121a and 122a may be formed in the internal electrodes 121 and 122. The first and second disconnected regions 121b and 122b may include a dielectric or a void derived from the dielectric layer 111. That is, according to an exemplary embodiment, the first and second internal electrodes 121 and 122 may include two or more first and second electrode regions 121a and 122a, respectively, including a conductive material and the first and second disconnected regions 121b and 122b, which are spaces between the first and second electrode regions 121a and 122a.

In an exemplary embodiment, the connectivity of the first and second internal electrodes 121 and 122 may be further improved by disposing the secondary phase 123 including Al in at least a portion of the disconnected regions 121b and 122b. At this time, the connectivity of the first and second internal electrodes 121 and 122 may refer to a ratio of the sum of the lengths of the first and second electrode regions 121a and 122a to the total length of the internal electrodes 121 and 122, and the electrode connectivity may be preferably 81% or more. However, disposing the secondary phase 123 including Al in at least a portion of the disconnected regions 121b and 122b may not mean that the secondary phase 123 including Al is disposed only in the first and second disconnected regions 121b and 122b. That is, the secondary phase 123 including Al may also be formed in a region forming the interface between the first and second internal electrodes 121 and 122 and the dielectric layer 111, among the first and second electrode regions 121a and 122a, as well as in at least a portion of the first and second disconnected regions 121b and 122b.

Example

Table 1 compares and evaluates electrode connectivity, capacitance per unit volume, and breakdown voltage characteristics according to the ratio of the area occupied by the secondary phase to the area of the capacitance forming portion (Ac) in the multilayer electronic component 100 according to an exemplary embodiment in the present disclosure.

The results of Table 1 show the relative values for each test number by setting a value of test number 1 in which the area occupied by the secondary phase is 0 relative to the area of the capacitance forming portion (Ac) as 1, and the multilayer electronic components corresponding to all test numbers have substantially the same configuration except for the ratio of the area occupied by the secondary phase including Al to the area of the capacitance forming portion (Ac).

The area ratio (%) of the secondary phase is a ratio of the area occupied by the secondary phase 123 including Al to the area of the capacitance forming portion (Ac), which is an average value measured from an image obtained by magnifying a central portion of the capacitance forming portion Ac and each of both side regions (9.2 μm×5.4 μm) of the central portion by 30,000 times with an SEM, after polishing the cross-sections of the multilayer electronic component 100 in the first and third directions up to the central portion in the second direction. In the image magnified by the SEM, the proportion of the area occupied by the secondary phase 123 including Al relative to the area of the capacitance forming portion (Ac) was measured by measuring the ratio of the area of pixels occupied by the secondary phase including Al to the area of all pixels of the cross-section, and an average value of values measured from 50 samples per each test number was calculated.

For electrode connectivity, an average value was calculated by measuring a central portion of the capacitance forming portion (Ac) and each of both side regions (9.2 μm×5.4 μm) of the central portion with a 200-magnification optical microscope (OM), after polishing the cross-sections of the multilayer electronic component 100 in the first and third directions up to the central portion in the second direction in 50 samples per test number. Specifically, when a region of the internal electrodes including a conductive material is referred to as an electrode region and a space between the electrode regions is referred to as a disconnected region, the ratio of the sum of the lengths of electrode regions relative to a total length of the internal electrodes was measured.

For the capacitance per unit volume, an average value of capacitance values measured from 50 samples per test number was taken and measured with an LCR meter (Kesight E4980A) under 1 kHz 0.5V (AC). All of the measurement samples were subjected to measurement after heat treatment at 150° C. for 1 hour and aging at room temperature for 2 hours.

Breakdown voltage was measured for 50 samples and an average value was calculated, and a voltage was measured as the breakdown voltage when an insulation resistance (IR) value fell below 10000Ω by measuring under a 100V/s boost condition.

TABLE 1

| Test number | Ratio of area of secondary phase (%) | Electrode connectivity | Capacitance per unit volume | Breakdown voltage |
| --- | --- | --- | --- | --- |
| 1 | 0.00 | 1 | 1 | 1 |
| 2 | 0.01 | 1 | 0.99 | 1 |
| 3 | 0.03 | 1.01 | 1.01 | 1.08 |
| 4 | 0.34 | 1.04 | 1.01 | 1.35 |
| 5 | 0.40 | 1.05 | 1.02 | 1.52 |
| 6 | 0.53 | 1.05 | 0.98 | 1.22 |
| 7 | 0.70 | 1.06 | 0.97 | 1.12 |
| 8 | 4.80 | 1.19 | 0.95 | 1 |

Test number 1 is a case in which the area occupied by the secondary phase 123 including Al relative to the area of the capacitance forming portion (Ac) is 0%, and evaluation was performed with the electrode connectivity, capacitance per unit volume, and breakdown voltage as 1.

Referring to Test numbers 1 and 2, it can be seen that, when the ratio of the area occupied by the secondary phase 123 to the area of the capacitance forming portion (Ac) is less than 0.03%, the area occupied by the secondary phase 123 to the area of the capacitance forming portion (Ac) is not sufficient, resulting in that the effect of improving the electrode connectivity of the internal electrodes 121 and 122, the capacitance per unit volume, and the breakdown voltage is insufficient.

Referring to Test numbers 3 to 5, it can be seen that, when the ratio of the area occupied by the secondary phase 123 to the area of the capacitance forming portion (Ac) is 0.03% or more, the area occupied by the secondary phase 123 to the area of the capacitance forming portion (Ac) is sufficient, so that the thermal characteristics of the internal electrodes 121 and 122 may be improved, and the electrode connectivity gradually increases as the ratio of the area occupied by the secondary phase 123 to the area of the capacitance forming portion (Ac) increases.

Meanwhile, referring to Test numbers 6 to 8, it can be seen that, when the ratio of the area occupied by the secondary phase 123 to the area of the capacitance forming portion (Ac) exceeds 0.40%, the capacitance per unit volume and breakdown voltage are lowered even though the connectivity of the first and second internal electrodes 121 and 122 is improved.

Therefore, as in an exemplary embodiment in the present disclosure, the ratio of the area occupied by the secondary phase 123 to the area of the capacitance forming portion (Ac) is adjusted to 0.03% or more and 0.40% or less, thereby improving the connectivity of the internal electrodes 121 and 122 and improving the capacitance per unit volume and the breakdown voltage at the same time, and thus, excellent reliability of the multilayer electronic component 100 may be secured.

One of the various effects of the present disclosure is to improve the capacitance per unit volume and the BDV characteristics of the multilayer electronic component by including a secondary phase including Al at the interface between the internal electrodes and the dielectric layer in the capacitance forming portion (Ac).

One of the various effects of the present disclosure is to improve the electrode connectivity of the internal electrodes by including a secondary phase including Al at the interface between the internal electrodes and the dielectric layer in the capacitance forming portion (Ac).

One of the various effects of the present disclosure is to improve the reliability of the multilayer electronic component by including a secondary phase including Al at the interface between the internal electrodes and the dielectric layer in the capacitance forming portion (Ac), even when the dielectric layer or the internal electrodes are formed to be thin in order to achieve high capacitance and miniaturization.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a body including a capacitance forming portion including a dielectric layer and internal electrodes alternately disposed with the dielectric layer in a first direction and a cover portion disposed on one surface and other surface of the capacitance forming portion in the first direction; and
   external electrodes disposed on the body,
   wherein a secondary phase including aluminum (Al) is disposed at a part of an interface between an internal electrode of the internal electrodes and the dielectric layer, and
   a ratio of an area occupied by the secondary phase to an area of the capacitance forming portion is 0.03% or more and 0.4% or less.

2. The multilayer electronic component of claim 1, wherein the secondary phase further includes barium (Ba).

3. The multilayer electronic component of claim 2, wherein a molar ratio of Al to Ba included in the secondary phase is 0.5 or more and 2.5 or less.

4. The multilayer electronic component of claim 1, wherein the secondary phase includes an oxide including Al.

5. The multilayer electronic component of claim 1, wherein the secondary phase comprises $Al_2O_3$.

6. The multilayer electronic component of claim 1, wherein the secondary phase is in a crystalline form.

7. The multilayer electronic component of claim 1, wherein the secondary phase further includes at least one selected from the group consisting of Dy, Y, Ho, Er, La, and Sm.

8. The multilayer electronic component of claim 1, wherein
   the internal electrodes include first and second internal electrodes alternately disposed in the first direction;
   the external electrodes include a first external electrode connected to the first internal electrode and a second external electrode connected to the second internal electrode,
   the first external electrode and the second external electrode are spaced apart from each other in a second direction perpendicular to the first direction of the body, and
   when a direction perpendicular to the first and second directions is referred to as a third direction,
   the ratio of the area occupied by the secondary phase to the area of the capacitance forming portion is a value measured from cross-sections of the multilayer electronic component cut in the first and third directions.

9. The multilayer electronic component of claim 1, wherein an average thickness of the internal electrodes is 0.35 μm or less.

10. The multilayer electronic component of claim 1, wherein an average thickness of the dielectric layer is 0.35 μm or less.

11. The multilayer electronic component of claim 1, wherein, when the internal electrodes include two or more electrode regions including a conductive material, and a space between the electrode regions is referred to as a disconnected region, the secondary phase is disposed in at least a portion of the disconnected region.

12. The multilayer electronic component of claim 11, wherein an electrode connectivity is 81% or more, where the electrode connectivity is a ratio of a sum of lengths of the electrode regions to a total length of the internal electrodes is referred to as electrode connectivity.

13. The multilayer electronic component of claim 1, wherein
   the internal electrodes include first and second internal electrodes alternately disposed in the first direction;
   the external electrodes include a first external electrode connected to the first internal electrode and a second external electrode connected to the second internal electrode,
   the first external electrode and the second external electrode are spaced apart from each other in a second direction perpendicular to the first direction of the body, and
   when a direction perpendicular to the first and second directions is referred to as a third direction,
   the body further includes a margin portion disposed on one surface and the other surface of the capacitance forming portion in the third direction.

14. The multilayer electronic component of claim 13, wherein an average width of the margin portion is 15 μm or less.

15. The multilayer electronic component of claim 1, wherein an average thickness of the cover portion is 15 μm or less.

* * * * *